United States Patent [19]
Sosnowski

[11] Patent Number: 5,982,052
[45] Date of Patent: Nov. 9, 1999

[54] DC POWER CONTROL OF SWITCHING DEVICES

[75] Inventor: Zenon Sosnowski, Sydney, Australia

[73] Assignee: H.P.M. Industries Pty Limited, Darlinghurst, Australia

[21] Appl. No.: 09/043,169

[22] PCT Filed: Sep. 13, 1996

[86] PCT No.: PCT/AU96/00573

§ 371 Date: May 11, 1998

§ 102(e) Date: May 11, 1998

[87] PCT Pub. No.: WO97/10639

PCT Pub. Date: Mar. 20, 1997

[30] Foreign Application Priority Data

Sep. 15, 1995 [AU] Australia ................................ PN5476

[51] Int. Cl.⁶ ................................................. H01H 35/00
[52] U.S. Cl. ...................... 307/126; 361/168.1; 361/186; 361/191; 364/528.26; 364/528.32
[58] Field of Search ................................. 307/31, 32, 38, 307/39, 40, 112, 113, 116, 125, 126, 35; 340/146.2, 540, 657, 660, 661, 664, 825, 825.04, 825.06, 825.07, 825.18; 361/160, 166, 167, 168.1, 170, 171, 186, 191; 364/528.21, 528.26, 528.3

[56] References Cited

U.S. PATENT DOCUMENTS

| | | | |
|---|---|---|---|
| 4,348,582 | 9/1982 | Budek | 307/40 |
| 4,471,232 | 9/1984 | Peddie et al. | 307/35 |
| 4,785,927 | 11/1988 | Dobbins | 194/200 |
| 4,903,335 | 2/1990 | Shimizu | 455/343 |
| 4,963,763 | 10/1990 | Minagawa et al. | 307/35 |
| 5,012,120 | 4/1991 | Minagawa et al. | 307/35 |
| 5,191,520 | 3/1993 | Eckersley | 307/35 |
| 5,777,894 | 7/1998 | Settles et al. | 364/550 |
| 5,805,989 | 9/1998 | Ushida | 455/343 |

FOREIGN PATENT DOCUMENTS

| | | |
|---|---|---|
| 0 360 543 | 9/1989 | European Pat. Off. . |
| 89-272055/38 | 9/1989 | European Pat. Off. . |
| WO 92/16041 | 9/1992 | WIPO . |

*Primary Examiner*—Jeffrey Gaffin
*Assistant Examiner*—Peter Zura
*Attorney, Agent, or Firm*—Merchant & Gould P.C.

[57] ABSTRACT

A system for controlling the connection of power from a main supply (11) to electrical devices (22) by way of switching devices (19). The system includes a low voltage, direct current power supply (10), a plurality of command units (15) connected to and powered from the power supply by way of an electrical connection (14), and a plurality of switching devices (19) connected to and powered from the power supply by way of the electrical connection (14). Each of the command units (15A, 15B and 15C) is arranged to generate a uniquely coded pulse-form command signal to a central processing unit (18) by way of the electrical connection (14), and the central processing unit is arranged to generate pulse-form actuating signals having codes determined by the command signals. The central processing unit is arranged to feed the actuating signals to the switching devices (19) by way of the electrical connection (14). The power supply (10) incorporates a voltage regulator (11) which includes circuitry which functions to detect the presence of the pulse-form signals on the electrical connection (14), and the voltage regulator includes means for modulating the output voltage of the power supply between two discrete levels responsive to and at a rate corresponding with that of the pulse-form signals.

6 Claims, 2 Drawing Sheets

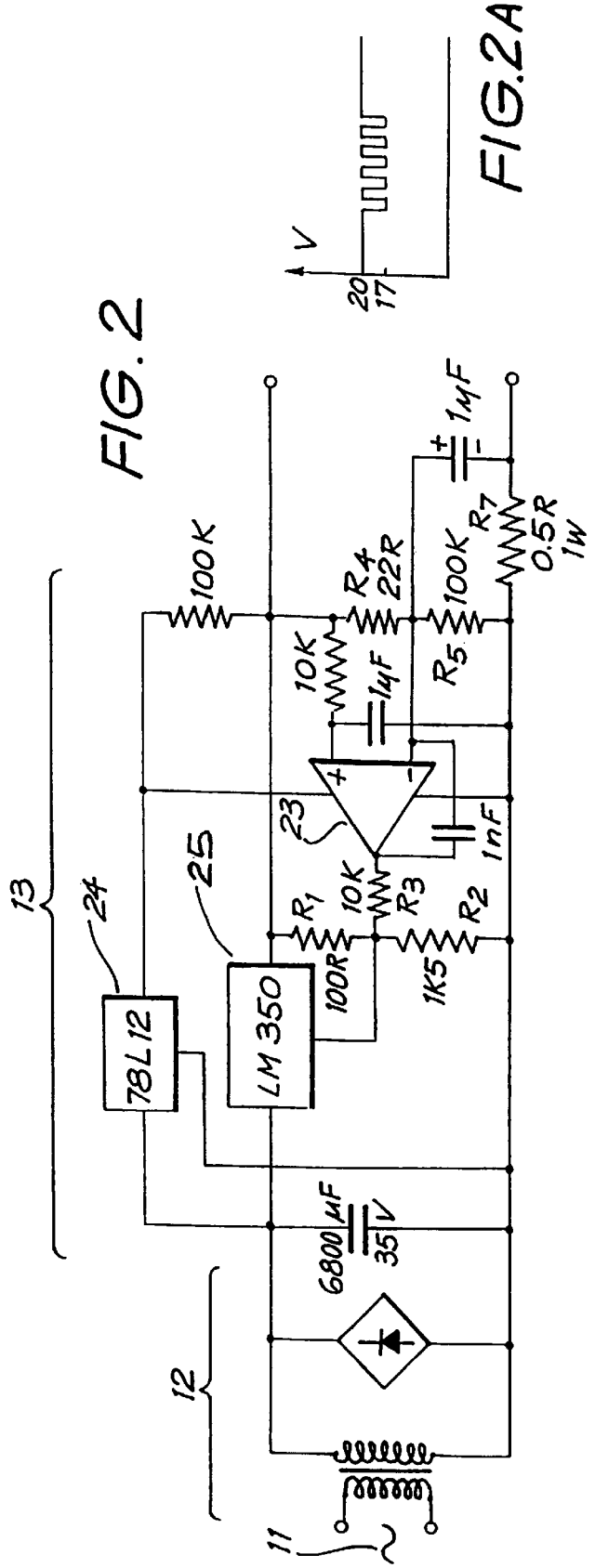
FIG.2
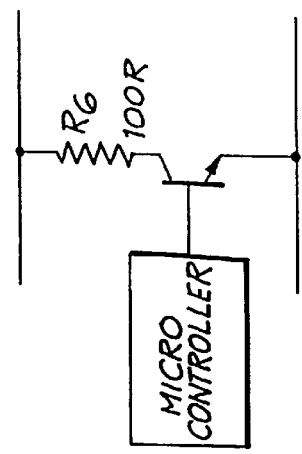
FIG.2A
FIG.3

DC POWER CONTROL OF SWITCHING DEVICES

FIELD OF THE INVENTION

This invention relates to a system for controlling actuation of main powered electrical devices, using a low voltage, direct current control circuit to command and effect switching of power to the devices. The invention has been developed and is hereinafter described by way of example in the context of a system that utilizes a central processor which is arranged to act on command signals and issue actuating signals for the purpose of switching power to devices in a domestic residence or other building.

BACKGROUND OF THE INVENTION

In a system to which the invention relates, common control circuit wiring is employed to carry command signals, actuating signals and current at a level sufficient to effect actuation of switching relays. This approach minimizes the amount of wiring required for a given system installation but it does impose a requirement for voltage regulation in order that reliable operation will occur with changing circuit conditions, including changes to the size of the installation. The inclusion of a voltage regulated, direct current power supply as such does not present any difficulties, but a problem occurs when attempting to modulate the otherwise constant control circuit voltage with command and/or actuating signals. That is, a conventional regulated power supply will present zero impedance to an alternating signal and, thus, effectively absorb the command and actuating signals.

One attempt has been made to avoid this problem by arranging for the response time of voltage regulation to be slow relative to the frequency of modulation used by both the command and the actuating signals. However, this solution requires the introduction of R.C time constant circuit components, resulting in consequential power loss and imposing limits on the number of load devices that may be connected to a given installation.

DESCRIPTION OF THE INVENTION

The present invention seeks to avoid this problem, without increasing the amount of control circuit wiring, by arranging for the control circuit voltage to be regulated between two levels at the modulation rate of the control and actuating signals.

Thus, the present invention may be defined broadly as providing a system for controlling the connection of power to electrical devices by way of switching devices and which comprises a low voltage, direct current power supply, an electrical connection between the power supply and the switching devices, and means for generating and feeding to the electrical connection pulse-form control signals. The system is characterized in that the power supply includes means for detecting the presence of the pulse-form control signals and means for modulating the output voltage of the power supply between two discrete levels responsive to and at a rate corresponding with that of the pulse-form control signals.

The invention in a more specific, preferred form may be defined as providing a system for controlling the connection of power to electrical devices by way of switching devices and which comprises a low voltage, direct current power supply, a plurality of command units connected to and powered from the power supply by way of an electrical connection, and a plurality of switching devices connected to and powered from the power supply by way of the electrical connection. Respective ones of the command units are arranged to generate uniquely coded pulse-form command signals and to feed the command signals to a central processing unit by way of the electrical connection, and the central processing unit is arranged to generate pulse-form actuating signals having codes determined by respective command signals and to feed the actuating signals to the switching devices by way of the electrical connection. The system is characterized in that the power supply incorporates a voltage regulator which includes means for detecting the presence of the pulse-form signals and means for modulating the output voltage of the power supply between two discrete levels responsive to and at a rate corresponding with that of the pulse-form signals.

The two discrete output voltage levels of the power supply comprise an upper level which corresponds to the unmodulated voltage level of the supply and a lower level corresponding to the minimum voltage level required for the command and/or actuating signals. The upper voltage level will typically be in the order of 15 to 30 volts, and the difference between the upper and lower voltage levels will typically be in the order of one to five volts.

In use of the above defined system (when in its preferred form) the switching devices are arranged to effect connection of power to associated ones of the electrical devices responsive to detection by the switching devices of appropriately coded actuating signals.

PREFERRED FEATURES OF THE INVENTION

The command units preferably comprise signal generators that produce digital form coded signals when operated. Operation may be effected manually, for example by operation of a push-button type switch, or remotely from a further signal generator such as an infra-red signal radiating device.

The switching devices preferably comprise electromagnetic relays having contacts which are either normally open or normally closed, depending upon the electrical devices to which the relays are required to switch power. Alternatively, the switching devices may comprise bistable relay units. In either case, each of the switching relays includes circuitry which is arranged to detect for the existence of an appropriately coded actuating signal from the central processing unit and to initiate a switching operation upon detection of the appropriate actuating signal.

The central processing unit may comprise any conventional type of stand-alone processor or computer and it preferably incorporates a keyboard or other mechanism to permit data entry and, possibly, programming of the system to meet specific operational requirements.

The system may be operated at various levels of complexity, and at the simplest level the system may be employed to control energization of predetermined room lighting responsive to manual activation of one or more switch-operated command units. Again at a simple level, the system may be programmed to control energization of predetermined internal and/or external lighting and to arm an intruder alarm in the event that a mobile target is detected to be present by command units in the form of proximity detectors. As a further example, the system may be programmed to effect energization of lighting and other electrical devices at predetermined times, either for the purpose of readying a dwelling for intending occupancy or to give the impression of residential occupation to would-be intruders. Override controls may be programmed into the system, for example to prevent energization of lighting under high ambient light conditions or to bar actuation of selected electrical devices.

The invention will be more fully understood from the following description of a preferred embodiment of a system for controlling the actuation of mains powered electrical devices in a domestic residence. The description is provided with reference to the accompanying drawings.

BRIEF DESCRIPTION OF THE DRAWINGS

In the drawings

FIG. 2 shows a circuit diagram of a power supply that is incorporated in the system of FIG. 1, FIG. 2A is a graphical representation of an example output voltage of the power supply, and FIG. 3 shows a diagrammatic representation of a signal generator which is incorporated in a command unit in the system of FIG. 1.

DETAILED DESCRIPTION OF PREFERRED EMBODIMENT OF THE INVENTION

Figure 1:
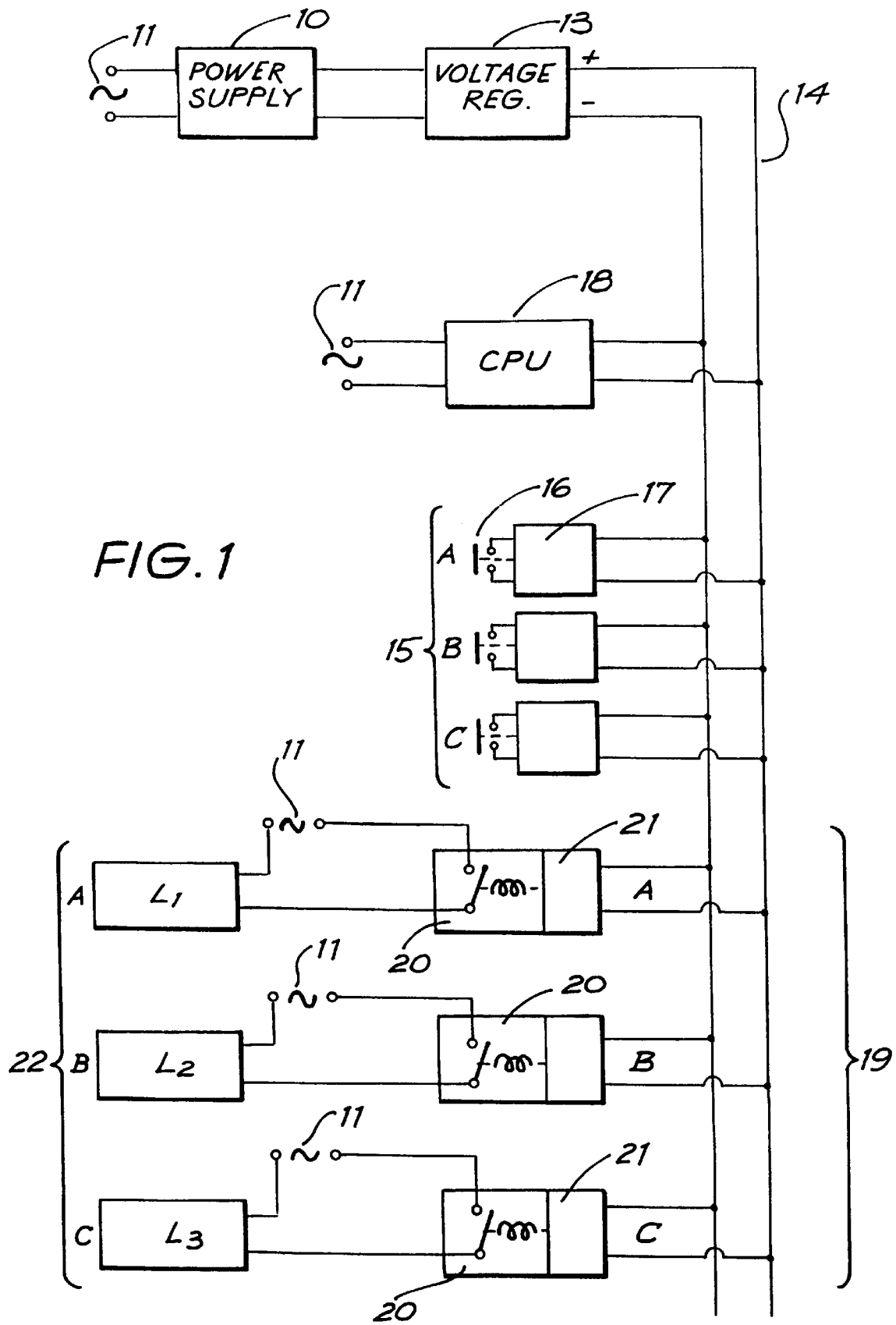
FIG. 1 shows a schematic representation of the complete system.

As illustrated, the complete control system comprises a power supply 10 which is connected to a single phase, alternating current main supply 11. The power supply incorporates a transformer/bridge rectifier circuit 12, as shown in FIG. 2, and it provides a direct current output to a voltage regulator 13. The output from the voltage regulator is maintained at a nominal potential of 20 volts and is connected to two-wire control circuit wiring 14.

Three command units 15A, B and C are shown connected to the control circuit wiring 14, although a typical system would normally employ a significantly greater number of command units. Each command unit 15 incorporates a manually operable push-button type switch 16 and a signal generator 17. The signal generator associated with each command unit 15 is shown in FIG. 3, is powered by way of the control circuit wiring 14 and is arranged to generate a unique command signal composed of a digital modulation of the control circuit voltage.

The command signals from the command units 15 are detected by a central processing unit 18 which is connected to the control circuit wiring 14 and powered from the main supply 11. The central processing unit 18 is programmed to translate detected command signals into actuating signals which are fed to the control circuit wiring for detection by actuator relay units 19A, B and C. The central processing unit is programmed to preclude simultaneous superimposition of two or more command and/or actuating signals on the control circuit wiring.

Also, the central processing unit 18 includes programming facilities which permit local programming or reprogramming of the system, using a keyboard (not shown), to effect extension of the system and/or to modify the translating functions of the central processing unit.

The actuator relay units 19 each incorporate a bistable relay 20 and detector/signal processing circuitry 21, the latter of which is arranged to detect for an appropriately coded actuation signal from the central processing unit 18 and to apply a relay operating signal to the associated relay 20 upon receipt of the actuating signal. Having been actuated to a closed condition, each relay 20 functions to connect an associated load 22 to the main supply 11.

As an example of one possible operating condition of the system, operation of the switch 16 in command unit 15A may produce a command signal having a code which is recognised by the central processing unit 18 as one which should be translated into an actuating signal which is detectable by relay unit 19C. Then, having detected the actuating signal, the relay unit 19C causes its relay 20 to close in order that main power will be connected to load 22C.

The power supply shown in FIG. 2 functions to maintain the 20 volt supply to the control circuit wiring 14 in the absence of any command or actuating signal on the control circuit wiring 14. For this purpose the power supply circuit incorporates a voltage regulator 22. To protect against "absorption" of the command or actuating signals, as a consequence of normal voltage regulation performed by the power supply, the power supply as shown in FIG. 2 is arranged to regulate or, expressed in an alternative way, modulate the output voltage to the control circuit wiring 14 between two levels at a rate which corresponds with that of the coded command and actuating signals that appear at any one time on the control circuit wiring. Thus, the power supply functions to detect for the presence of pulse-form signals generated by the command units 15 or by the central processing unit 18 and to modulate the supply voltage applied to the same control circuit wiring 14 on which the signals appear. Modulation of the supply voltage occurs responsive to the existence of a command or actuating signal and at a rate corresponding with that of the coded command or actuating signal. Thus, the supply voltage is modulated between the two (upper and lower) levels and in a manner which emulates the codes of the command or actuating signals. The upper level of the power supply voltage is +20 volts, as stated above, and the lower level is typically +17 volts as shown in the voltage signal that is graphed in FIG. 2A.

The voltage regulator 22 comprises an LM350 adjustable linear voltage regulator and its output level is determined by the value of the resistance ratio $R_2/R_1$ or, when a comparator 23 is controlled effectively to place resistance $R_2$ and $R_3$ in parallel, by the resistance ratio $R_2 \cdot R_3/R_1 \, (R_2+R_3)$.

With the specific circuit configuration shown in FIG. 3 and with the value of the output voltage being determined by the resistance ration $R_2/R_1$, the output voltage is maintained at a level of 20 volts with no command or actuator signals on the control circuit wiring 14.

The comparator 23 comprises an operational amplifier having a small offset, determined by the ratio $R_4/R_5$ and, because of the small offset, a separate regulated voltage source 24 is provided to ensure a constant voltage supply to the comparator circuit 23. The regulator 24 comprises a 78L12 constant voltage supply integrated circuit device.

When the system is operating without command or actuator signals on the control circuit wiring 14, the non-inverting input of the comparator 23 remains high and the output voltage level of the regulator 22 (determined by the resistance ratio $R_2/R_1$) is maintained high at 20 volts. However, if one of the command units as shown in FIG. 3 is actuated, current flow through the collector resistor $R_6$ in the signal generator 17 will be detected as current flow through resistor $R_7$ in the power supply circuit of FIG. 2. As a consequence and as a result of the low offset established by the value of resistors $R_4$ and $R_5$, the inverting input to the comparator 23 will go high relative to the non-inverting input, cause the output of the comparator to go low and effectively place resistor $R_3$ in parallel with resistor $R_2$. The output of the regulator 22 will then go low, with the circuit component values indicated to a level of approximately 17 volts.

The regulator output voltage will stay low until current flow through resistors $R_6$ and $R_7$ ceases, whereupon the regulator output will return to the high level. The same circuit operation will occur with generation of an actuator signal in the system.

I claim:

1. A system for controlling the connection of power to electrical devices by way of electrically actuated switching devices and which comprises:

a low voltage, direct current power supply for the switching devices, an electrical connection between the power supply and the switching devices, a plurality of actuatable command units connected in circuit with the electrical connection and arranged to generate and feed digitally coded pulse-form control signals to the electrical connection;

a central processing unit connected in circuit with the electrical connection and arranged to detect the control signals, to generate digitally coded pulse-form actuating signals in response to receipt of the control signals and to feed the actuating signals to the electrical connection;

the switching devices being arranged to effect switching operations responsive to detection of the presence of predetermined ones of the digitally coded actuating signals on the electrical connection; and the power supply incorporating means for detecting changes in the current flow in the electrical connection resulting from the presence of the pulse-form control signals and means for modulating the output voltage of the power supply between two discrete levels responsive to and at a rate corresponding with that of changes in the current flow attributable to the pulse-form signals.

2. The system as claimed in claim 1 wherein the central processing unit is programmed to translate respective ones of detected said command signals into predetermined said actuating signals.

3. The system as claimed in claim 1 wherein the central processing unit is programmed to preclude simultaneous superimposition of two or more command and/or actuating signals on the electrical connection between the power supply and the switching devices.

4. The system as claimed in claim 1 wherein each of the command units comprises a manually operable switch and means for generating the digitally coded command signal responsive to actuation of the switch.

5. The system as claimed in claim 1 wherein the switching devices comprise electromagnetic relays which are arranged to connect a main supply to the electrical devices.

6. The system as claimed in claim 1 wherein the power supply is arranged to provide an output having an upper voltage level in the absence of any said pulse-form signal on the electrical connection between the power supply and the switching devices, and in that the power supply is arranged to effect a reduction in the voltage level of the output responsive to and at the rate of any said pulse-form signal that is detected to exist on the electrical connection.

* * * * *